E. A. WALL.
CAM AND TAPPET MECHANISM.
APPLICATION FILED APR. 15, 1909.
947,874.
Patented Feb. 1, 1910.
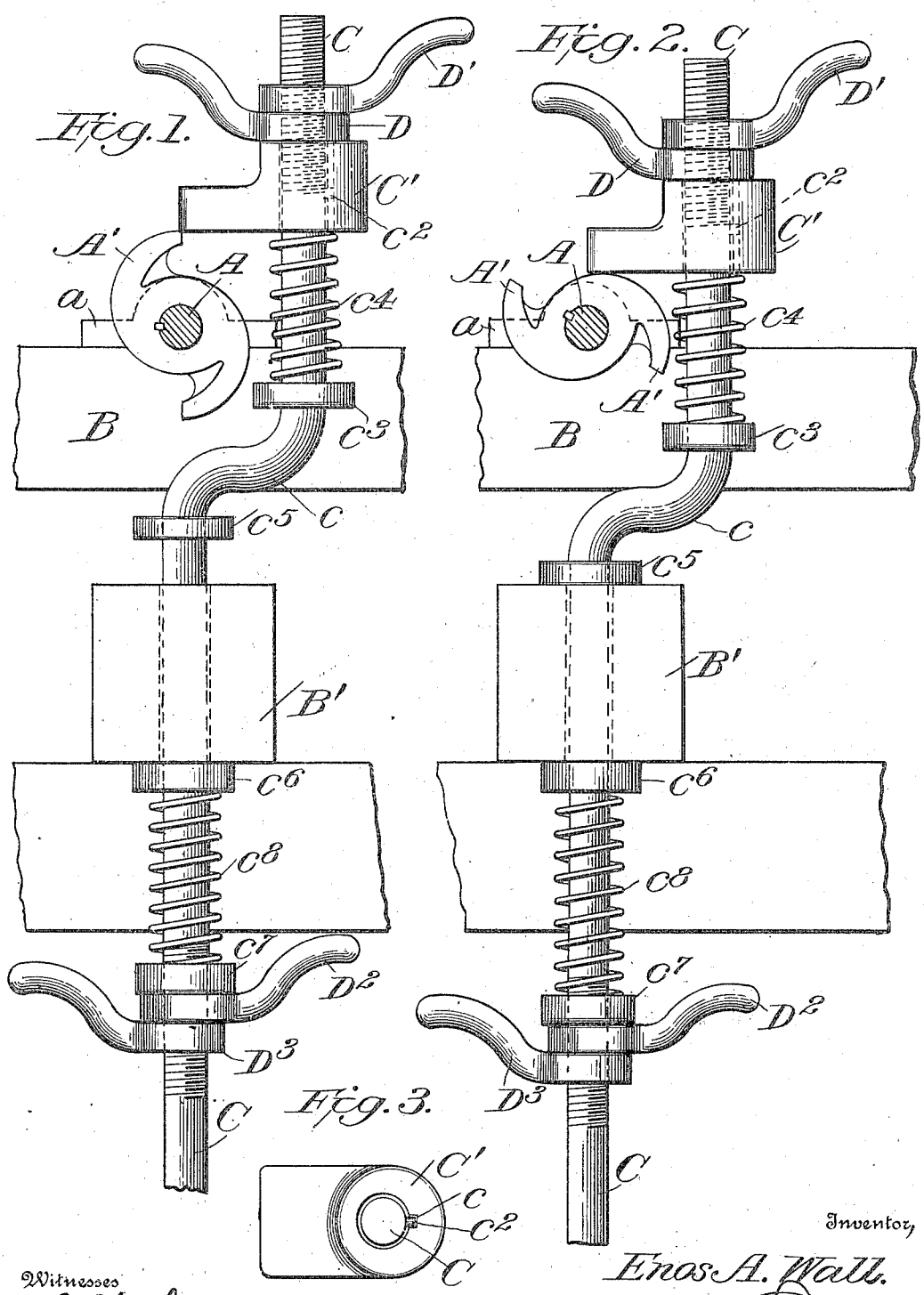
Witnesses
C. H. Walker
J. T. Walker
Inventor,
Enos A. Wall.
By Geo. H. Evans
Attorney

UNITED STATES PATENT OFFICE.

ENOS A. WALL, OF SALT LAKE CITY, UTAH.

CAM-AND-TAPPET MECHANISM.

947,874.  Specification of Letters Patent.  Patented Feb. 1, 1910.

Application filed April 15, 1909. Serial No. 490,022.

*To all whom it may concern:*

Be it known that I, ENOS A. WALL, a citizen of the United States, residing at Salt Lake City, in the county of Salt Lake and State of Utah, have invented certain new and useful Improvements in Cam-and-Tappet Mechanism, of which the following is a specification.

My invention relates to improvements in cam and tappet mechanisms.

The object of the invention is to provide means for adjusting the tappet on its rod toward the cam while the latter is rotating by means of a nut at the outer side of the tappet and a spring bearing against the inner side of the tappet and pressing it firmly against the nut. This object I accomplish by the mechanism shown in the accompanying drawing, in which—

Figures 1 and 2 are side elevations of my improved mechanism with the parts in different positions, and Fig. 3 is a plan of the tappet.

A designates a shaft mounted in suitable bearings $a$ on a solid framework B and provided with a two-armed cam A'. The shaft A will be rotated by suitable mechanism, not shown.

C is a rod mounted to reciprocate in a cross piece B' of the framing in longitudinal alinement with the shaft A. The rod C is offset at $c$ at its upper or outer end and extends past the cam A' where it is provided with a loose tappet C, overlying the cam. The tappet C' is preferably provided with an internal groove $c'$ engaged by a spline $c^2$ on the rod so as to prevent the tappet from turning on the rod while permitting it to be moved longitudinally thereon. On the upper threaded end of the rod C is an adjusting handle-nut D and an upper similar set or lock nut D'. Below the tappet a fixed collar $c^3$ is provided on the rod C, and between this collar $c^3$ and tappet C' is a strong spiral spring $c^4$ tending to force the tappet hard against the nut D.

Where a jarring motion is desired, as in certain classes of ore washers or separators, the rod C will be provided with a fixed bumper-collar $c^5$ which strikes the bumper-bar B', imparting a jarring motion to the part to which the lower or inner end of the rod C is or may be attached. In the case of other classes of machines such as ore stamps and the like the bumper $c^5$ will not be necessary. Below the frame bar B' is a bearing collar $c^6$ through which the rod freely slides and therebelow is a loose cup-like collar $c^7$ forming a bearing for the lower end of the rod-projecting spring $c^8$. The collar $c^7$ rests against a handled adjusting nut D² below which is a like set nut D³. In many classes of machines it is highly essential that the length and force of the throw of the operating rod may be adjusted to a nicety without stopping the machine, and this my construction provides for.

In order to lengthen or shorten the throw of the rod C it is simply necessary to loosen the set nut D' and then turn the adjusting nut D in the proper direction; the spring $c^4$ keeping the tappet to the nut.

To change the force of the throw after its length has been determined the set nut D³ will be loosened and the adjusting nut turned in the desired direction.

It will be seen that owing to the offset $c$ the cam will act on the rod C in the plane of its longitudinal axis and thus all lateral or bending strain be avoided, and the cam imparts a slow retraction to the rod while its spring $c^8$ gives the necessary sudden projection to the rod as soon as the cam passes from under the tappet.

The parts may be set vertically, as shown, or horizontally, according to the kind of machine to be actuated or work to be performed.

What I claim is:

1. A cam and tappet mechanism comprising, a reciprocating rod, a tappet loose thereon, an adjusting nut on the rod at the outer side of the tappet, a spring engaging the inner side of the tappet and holding it against the nut, and a rotary cam also engaging the inner side of the tappet against the action of the adjusting nut.

2. A cam and tappet mechanism comprising, a reciprocating rod, a tappet loose thereon, adjusting and set nuts on the rod at the outer side of the tappet, a spring on the rod engaging the inner side of the tappet and holding it against the adjusting nut, a collar on the rod against which the inner end of the spring bears, and a rotary cam also engaging the inner side of the tappet against the action of the adjusting nut.

3. A cam and tappet mechanism comprising, a reciprocating rod, a tappet loose thereon, means for preventing the tappet from turning on the rod, an adjusting nut on the rod at the outer side of the tappet, a spring mounted on the rod and engaging the inner side of the tappet to hold it against the nut, and a rotary cam also engaging the inner side of the tappet against the action of the adjusting nut.

4. A cam and tappet mechanism comprising, a reciprocating rod offset between its ends, a tappet loose on the rod, an adjusting nut on the rod at the outer side of the tappet a spring engaging the inner side of the tappet and holding it against the nut, and a rotary cam also engaging the inner side of the tappet against the action of the adjusting nut.

In testimony whereof I affix my signature, in presence of two witnesses.

ENOS A. WALL.

Witnesses:
E. H. PARKINS,
HAZEL LONGLEY.